D. H. McGUIRE.
COTTON SEED PLANTER.
APPLICATION FILED FEB. 3, 1909.
993,183.
Patented May 23, 1911.
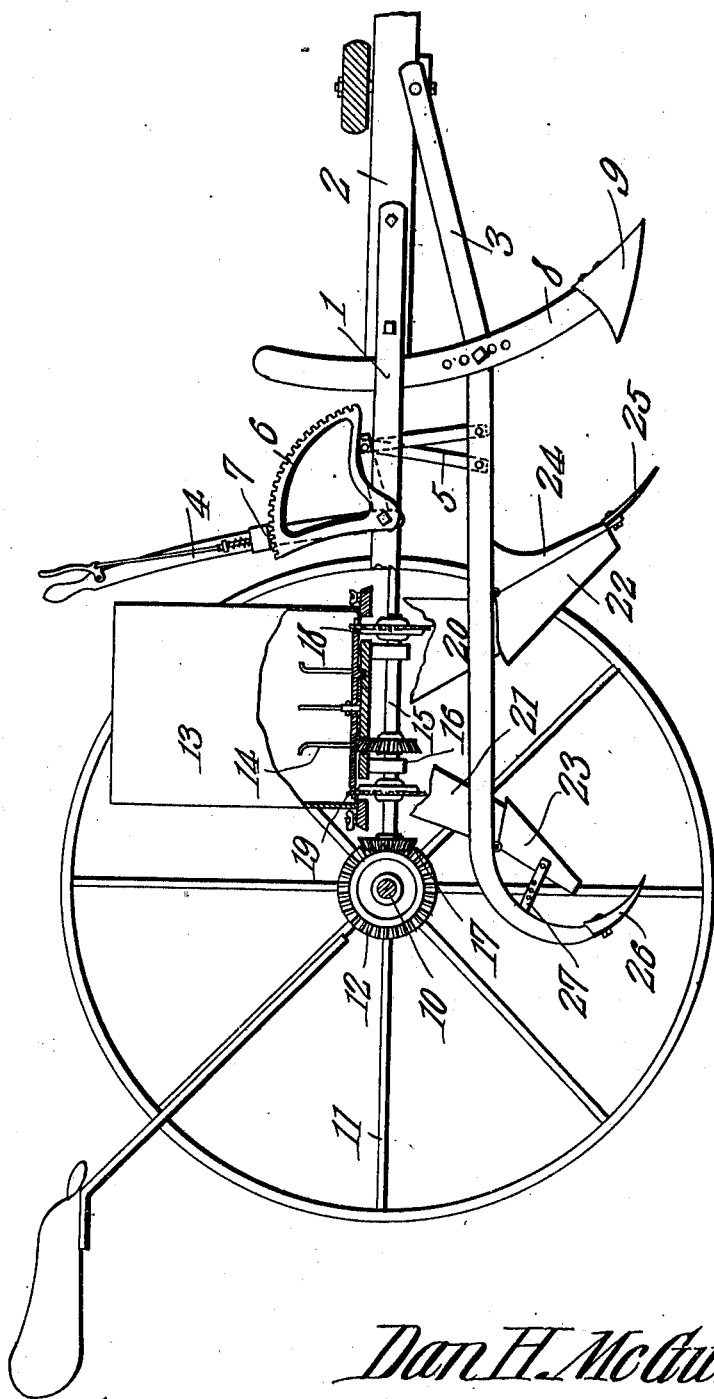
Witnesses
Inventor
Dan H. McGuire.
By C. A. Snow & Co.
Attorneys

UNITED STATES PATENT OFFICE.

DANIEL HARRY McGUIRE, OF PLEDGER, TEXAS.

COTTON-SEED PLANTER.

993,183.  Specification of Letters Patent.  Patented May 23, 1911.

Application filed February 3, 1909. Serial No. 475,852.

*To all whom it may concern:*

Be it known that I, DANIEL H. McGUIRE, a citizen of the United States, residing at Pledger, in the county of Matagorda and State of Texas, have invented a new and useful Cotton-Seed Planter, of which the following is a specification.

This invention has relation to cotton seed planters, and it consists in the novel construction and arrangement of its parts hereinafter shown and described.

The object of the invention is to provide a planter which is adapted to deposit a double row of seed in the ground at one operation, with a thin layer of earth between the two rows of seed. By planting the two rows of seed as above indicated, should the soil bake as a consequence of heavy rains, and one row fail to come up, the other row will sprout, and result in a stand of plants without necessitating the expense of replanting.

With the above object in view the planter consists of a frame, to which is pivotally connected a beam which in turn carries a series of furrow-openers and closers, hereinafter to be described. A hopper is mounted upon the frame and chutes are located under the seed outlets thereof and are adapted to convey the seed into their respective furrows.

In the accompanying drawing the figure is a side elevation of the planter, with parts broken away, and parts in section.

The planter consists of the frame 1, to the forward end of which is attached the rear end of the tongue 2. A beam 3 is pivotally connected at its forward end to the said tongue 2. A lever 4 is fulcrumed upon the frame 1 and is operatively connected at its working end with the beam 3 by means of the links 5. A gear segment 6 is mounted upon the frame 1 and is adapted to be engaged by the pawl 7 carried by the lever 4.

A standard 8 is adjustably attached to the forward portion of the beam 3, and carries, at its lower end, the furrow-opening plow-point 9. The rear portion of the frame 1 is supported upon the axle 10, which, in turn, is mounted upon the traction wheels 11. A beveled gear wheel 12 is fixed to the intermediate portion of the said axle 10. A hopper 13 is mounted upon the frame 1, and is provided in its bottom with a rotary seed-stirring plate 14. A stub shaft 15 is journaled in the bearings 16 located below the hopper 13, and is provided at its rear end with a beveled pinion 17, which meshes with the beveled gear wheel 12. The seed-selecting wheels 18 and 19 are fixed to the stub shaft 15 and project at their upper portions through the bottom of the hopper 13. The tubes 20 and 21 are located below the wheels 18 and 19 respectively, and are adapted to receive the seed which the said wheels remove from the hopper 13. The lower portions of the tubes 20 and 21 telescope in the upper ends of the chutes 22 and 23.

A standard 24 depends from the intermediate portion of the beam 3, and is provided at its lower end with a plow-point 25. The lower end of the chute 22 terminates in the rear of the said plow-point 25. The rear end of the beam 3 is downwardly curved and is provided with a furrow-closing plow-point 26. The lower end of the chute 23 is located above and in front of the said furrow-closing plow-point 26, and is held in an adjusted position with relation thereto by means of the arm 27, which in turn is carried by the beam 3.

The operation of the planter is as follows:—As the planter moves along the surface of the ground the furrow-opener 9 opens a furrow in the soil, in the bottom of which a supplemental or additional furrow is opened by the plow-point 25. In this last said furrow the seed falling from the chute 22 are deposited, and immediately thereafter a thin layer of earth will fall back by gravity upon the seed thus deposited. In fact the seed which passes through the chute 22 is drilled into the bottom of the furrow opened by the furrow-opener 9. A second line of seed is deposited in the furrow which is opened by the furrow-opener 9, and this last row of seed is located above that row of seed which is deposited by the chute 22. The furrow-closer 26 following in the wake of both of the seed chutes will cover both rows of seed with the earth which was removed by the furrow-opener 9.

Having described my invention, what I claim as new, and desire to secure, by Letters Patent, is:—

A planter comprising a wheel-mounted frame, a hopper located upon the frame and having a plurality of outlets, a beam pivotally connected with the frame, a lever mechanism mounted upon the frame and operatively connected with the beam, a furrow-opener adjustably mounted upon the beam, a seed drill carried by the beam and located behind the furrow-opener, means for conducting seed from one of the outlets of the hopper to a point behind said drill, means for conducting seed from another of said outlets of the hopper into the furrow made by the furrow-opener and above the seed drilled in the bottom thereof, and a furrow-closer carried by the beam and adapted to close the furrow after the seed has been drilled and dropped therein.

In testimony that I claim the foregoing as my own, I have hereto affixed my signature in the presence of two witnesses.

DAN. HARRY McGUIRE.

Witnesses:
D. A. DICKSON,
JOHN ROTEN.

Copies of this patent may be obtained for five cents each, by addressing the "Commissioner of Patents, Washington, D. C."